Feb. 4, 1936.  E. P. HALLIBURTON  2,029,369
MONOLITHIC CEMENTITIOUS PIPE
Filed Oct. 10, 1933
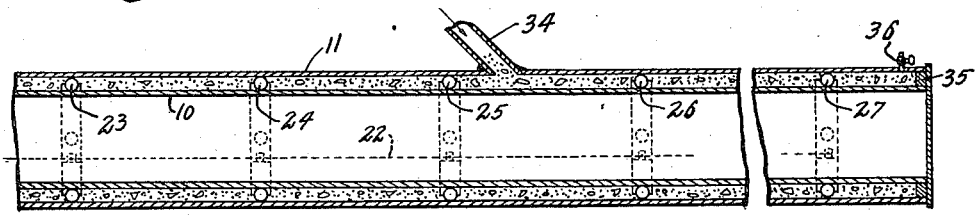
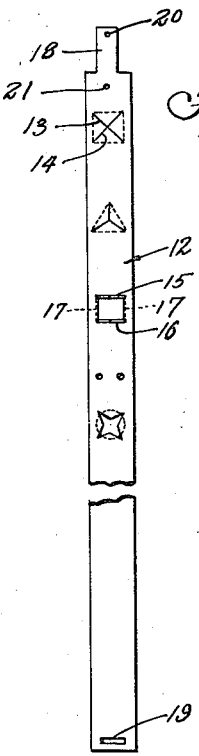
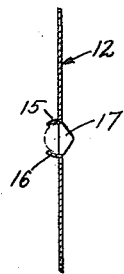
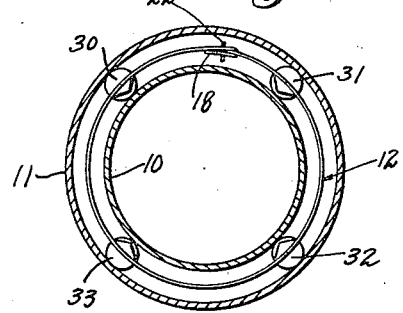
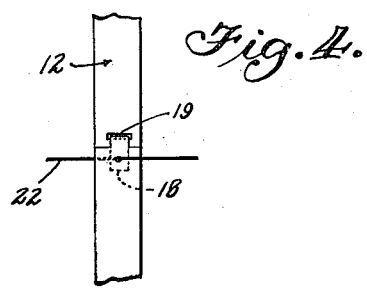
Inventor
Erle P. Halliburton
By Lyon & Lyon
Attorneys Patented Feb. 4, 1936

2,029,369

UNITED STATES PATENT OFFICE 2,029,369

MONOLITHIC CEMENTITIOUS PIPE

Erle P. Halliburton, Los Angeles, Calif.

Application October 10, 1933, Serial No. 692,935

5 Claims. (Cl. 138—66)

This invention relates to a pipe particularly adapted for use as a conduit for mineralized waters, oil, etc., said pipe being resistant to corrosion, thereby permitting its use in corrosive soils. The invention also discloses a method whereby long lengths of metallic pipe may be covered with a monolithic cementitious material or composition adapted to protect the metallic pipe from corrosion.

The method and apparatus of this invention is adapted for use on previously laid metallic pipe whereby a substantially monolithic cementitious covering may be applied to the pipe and is also adapted to the manufacture of long lengths of pipe line consisting essentially of a cementitious body. The invention has many uses, adaptations and advantages. For example, in the drilling of oil wells, water strata containing highly mineralized alkaline or other salty water are often penetrated and it is necessary to convey such water for a considerable distance in order to dispose of the same. Such highly mineralized or salty waters readily corrode and destroy metallic pipe and in the event the water is permitted to escape, it often injures or even destroys crops. It has been found, however, that if the metallic pipe is encased in cement, corrosion is retarded very appreciably and if the coating is of sufficient thickness, disintegration of the metallic pipe does not completely destroy the pipe lines, the cementitious coating then forming a conduit through which the waters may flow. Such cementitious coatings, furthermore, protect the exterior of the pipe from corrosion whenever the pipe line runs through or is embedded in a soil which is alkaline, swampy, or otherwise capable of exerting a destructive effect upon metallic pipe. It is therefore advantageous to encase all metallic pipe in a homogeneous, substantially monolithic casing of cementitious material.

In addition to the above adaptations, the invention is applicable to the manufacture of a pipe line consisting essentially of a cementitious body with perhaps a relatively light metallic or other liner. By the method of this invention, long lengths of pipe may either be made or covered, that is, sections of from 50 feet to 1,000 feet or more may be formed or covered at a single portion.

Certain problems are encountered in the formation of a cementitious coating on metallic pipe or in the formation of a long length of cementitious pipe. One of the problems is the maintenance of an outer casing or form in spaced relation about the inner liner or metallic pipe to be covered. In accordance with this invention, the outer casing or form is maintained in spaced relation to all the inner liner or metallic pipe by means of a plurality of non-metallic spacing elements circularly arranged about the pipe or liner at a number of transverse planes spaced longitudinally of the pipe. These non-metallic (preferably ceramic) elements are spaced from each other and become embedded in the cementitious body or covering. They may be retained in position by means of retaining rings, a suitable slurry of cementitious material being pumped into the annular space between the casing or form and the inner liner or metallic pipe, under pressure. After this cementitious body has set, the outer form or casing may be removed or shifted longitudinally of the pipe to a new position, or such casing or form may be allowed to remain on the pipe.

As a result, a monolithic cementitious pipe or covering is readily and quickly formed, no metal-to-metal contact existing between the inner pipe or liner and the exterior casing or form. As a result, corrosion is reduced to a minimum and the pipe maintained in effective condition for a prolonged period of time.

In order to facilitate understanding of this invention, reference will be had to the appended drawing, in which Fig. 1 is a longitudinal section, partly diagrammatic, of an arrangement of elements which may be used in carrying out the method of this invention.

Fig. 2 is a plan view of one form of a retaining ring blank used in holding the spacing elements in position.

Fig. 3 is a side elevation of the ring shown in Fig. 2.

Fig. 4 is a plan view illustrating one manner in which the retaining rings may be locked and held in position.

Fig. 5 is an enlarged transverse section through a pipe ready for the cementing operation.

As shown in Fig. 1, the method of this invention when applied to the formation of long monolithic pipe lines contemplates the use of an inner liner 10 in the form of a pipe of suitable diameter and of light weight. The exterior form or casing 11 may be made of sheet metal when the diameter of the pipe is large, or it may consist of a metallic pipe whose inner diameter is sufficiently greater than the exterior diameter of the pipe 10 to produce an annular space of the required thickness when the two elements 10 and 11 are placed in concentric relation. The casing should be capable of resisting an appreciable internal pressure without failing. Preferably, the spacing elements which separate the inner liner from the casing are non-metallic. By the term "non-metallic", reference is made to material such as marble, flint and other stones or compositions which have requisite strength and resistance to action of soil waters and liquids which it is intended to pass through the finished conduit. The term also includes ceramic material, by the latter term reference being made to glass, earthenware, glazed or vitrified clay bodies, porcelain, terra cotta, etc. The spacing elements may assume different forms but it has been found desirable to use spacers of substantially spherical form. Such spacers are preferably retained in a ring or cage which prevents them from accumulating in the bottom portion of the casing 11 and instead holds them in position at various points between the liner and the casing.

Figs. 2 and 3 illustrate a form of retaining ring which has been used. The ring consists of a strip of thin metal 12 provided with ball-receiving or retaining members. Two diagonal cuts 13 and 14 may be made in the ring so as to permit four triangular sections to be bent outwardly, these four sections then retaining the spherical spacing element when such spacer is introduced between the four prongs thus made. At 15 and 16 two of the triangular prong elements are shown extending in one direction whereas the other triangular elements, such as the element 17, extend in the opposite direction from the plane of the ring 12.

It is to be understood that the form of the retaining rings may be greatly varied. The ring illustrated in Figs. 2, 3 and 4 is provided with a tongue 18 at one end and a transverse slot 19 at the other, whereupon the ring may be wrapped around the liner and tightened by passing the tongue 18 through the slot 19 of the opposite end of the band 12. In order to facilitate longitudinal spacing of these rings, the tongue 18 may be provided with a perforation 20 and a similar perforation or aperture 21 may be made a short distance away from the tongue. After the tongue 18 is passed through the slot 19 and bent back upon itself (as shown in Fig. 4), a wire 22 may be passed through the perforations 20 and 21, thereby preventing the ring from uncoiling and at the same time assisting in maintaining the retaining rings in desired spaced position longitudinally of the liner 10.

In Fig. 1, certain spacing elements together with their retaining rings, have been embedded as indicated at 23 and 24, in a previously cemented portion of the pipe. Additional spacing elements are shown positioned at 25, 26 and 27. A retaining ring may contain any desired number of spacing elements; preferably, not less than three nor more than about eight. Fig. 5 illustrates the relationship between a liner, an outer pressure resistant casing, and a retaining ring containing four spherical spacing elements 30, 31, 32 and 33. Retaining rings of this or similar character are used at appropriate distances apart along the entire length of the blank. After a suitable length of liner and casing with the requisite number of spacing element rings has been assembled, the cementitious material such as a suitable slurry or hydraulic cement, is forced into the annular space under pressure. The slurry may contain sand and in the case of large pipe may even carry small gravel. The mixing and pumping devices are not shown but the inlet for the cementitious slurry is indicated at 34. The end of the length of pipe being cemented may be plugged as indicated at 35 and a suitable valve, such as the valve 36, is attached to the outer casing near the plug. The cement slurry is thus forced throughout the annular space, the air originally present being allowed to escape through the valve 36. After all of the air has escaped, the valve 36 is closed and a considerable pressure may be applied to the cement, causing the formation of a dense, homogeneous cementitious body portion to the finished conduit. Prior to the introduction of cementitious slurry, the annular space between the liner and the casing may be flushed with water to remove débris, etc.

After the cementitious material has set, the outer shell or casing may be removed and used during the cementing of another pipe. Longitudinally jointed casing is suitable for this purpose. In the case of pipe of small diameter, the casing is generally left in position.

In one instance 2300 feet of 3 inch pipe were cemented within a pipe having an inside diameter of 5$\frac{3}{16}$ inches, in 15 minutes. Three spacers consisting of marbles in a thin metal ring were used per 50 feet of pipe. The inner pipe was welded and the outer larger pipe was screwed in place; 171 sacks of Portland cement were used in making the slurry which was pumped into the space between the two pipes at a final pressure of 450 pounds. The pipe line was carrying a very corrosive salt water and was buried in an alkaline soil. No appreciable corrosion was visible in such pipe at the end of a year.

It is to be understood that in addition to the retaining rings and non-metallic spacing elements, the annular space between the liner and the exterior casing may contain longitudinal or spiral reinforcing wires and the like, depending upon the size of the conduit being made and the use to which it is to be put. Instead of having the retaining rings spaced from each other by means of a connecting wire such as the wire 22, illustrated in Fig. 4, the retaining rings themselves may carry prongs contacting with either the inner liner or the exterior casing so as to give rise to a frictional hold sufficient to prevent lateral shifting of the rings during the introduction of the cementitious slurry.

All such changes and modifications as come within the scope of the appended claims are embraced thereby.

I claim:
1. A pipe comprising a monolithic cementitious body, a metallic liner, a casing, and a plurality of non-metallic elements embedded in the cementitious body and extending from the liner to the outer surface of said body to said casing.

2. A pipe comprising a monolithic cementitious body, a metallic liner, a casing, and a plurality of substantially spherical non-metallic elements carried in retaining rings and embedded in the cementitious body, said non-metallic elements extending from the liner to the outer surface of said body and to said casing.

3. A pipe adapted to resist corrosion, comprising: an inner imperforate metallic liner pipe; a monolithic casing of hydraulic cement composition surrounding said metallic pipe; and a plurality of non-metallic ceramic elements embedded in said casing and extending from said metallic pipe to the outer surface of said cement casing whereby said pipe is free from metallic connections between said inner metallic liner and the exterior surface of said pipe.

4. A pipe adapted to resist corrosion, comprising: an inner imperforate metallic liner pipe; an exterior metallic housing; a monolithic casing of hydraulic cement composition surrounding said metallic pipe and filling the space between said pipe and housing; and a plurality of non-metallic ceramic elements embedded in said casing and extending from said metallic pipe to the said housing whereby said pipe is free from metallic connections between said liner and housing.

5. A pipe adapted to resist corrosion, comprising an inner imperforate metallic liner pipe; an exterior metallic housing; a monolithic casing of hydraulic composition surrounding the said metallic pipe and filling the space between said pipe and housing; strips of material, each provided with a plurality of ball retaining members, encircling said liner pipe; and non-metallic ceramic balls retained by said retaining members and spacing said strips from said liner pipe and from said housing whereby said pipe is free from metallic connections between said liner and housing.

ERLE P. HALLIBURTON.